M. MAURAN & J. H. MacMAHON.
PROCESS OF GENERATING OXYGEN.
APPLICATION FILED NOV. 23, 1909.
1,001,873.
Patented Aug. 29, 1911.
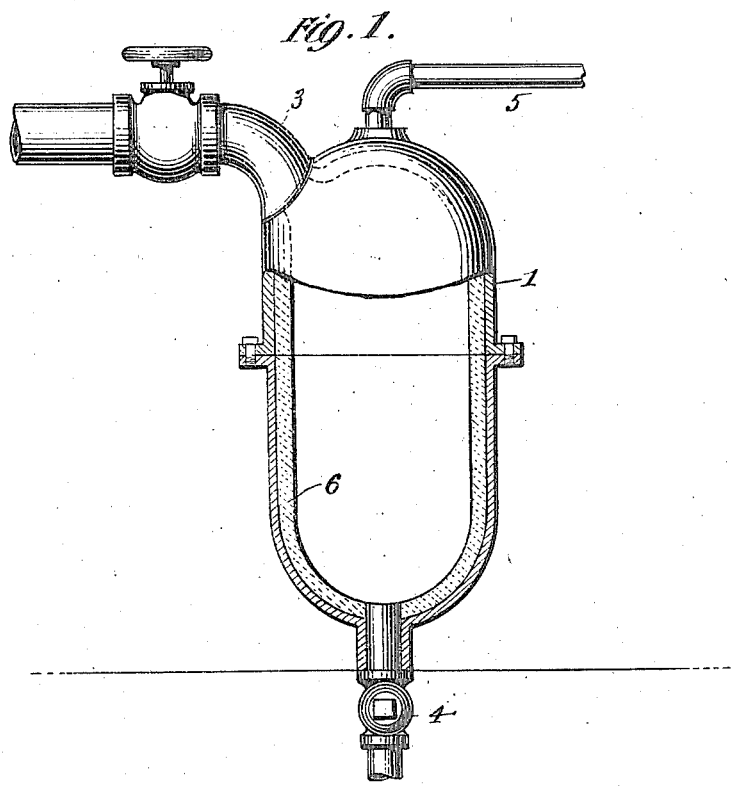
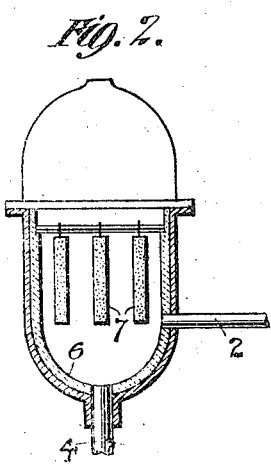
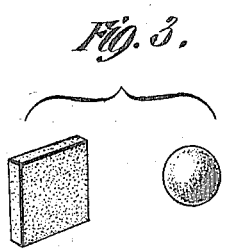
Witnesses:
Inventors
Max Mauran, James H. MacMahon
By their Attorneys

UNITED STATES PATENT OFFICE.

MAX MAURAN, OF NIAGARA FALLS, AND JAMES H. MacMAHON, OF LA SALLE, NEW YORK.

PROCESS OF GENERATING OXYGEN.

1,001,873.

Specification of Letters Patent. Patented Aug. 29, 1911.

Application filed November 23, 1909. Serial No. 529,532.

*To all whom it may concern:*

Be it known that we, MAX MAURAN and JAMES H. MACMAHON, citizens of the United States, residing, respectively, at Niagara Falls and La Salle, in the county of Niagara and State of New York, have invented certain new and useful Improvements in Processes of Generating Oxygen, of which the following is a full, clear, and exact description.

This invention relates to the production of oxygen on a commercial basis by means of a well known process wherein the gas yielding material, such as ordinary bleaching powder, or other hypochlorite in solution, is subjected to the action of heat and a catalytic agent such as a salt or oxid of cobalt. In previous attempts to obtain oxygen in this manner upon an industrial basis, the catalytic agent which is comparatively expensive, has necessarily been allowed to go to waste before its utility has been fully destroyed. In other words, the catalytic agent has been introduced into the solution in the form of a liquid or loose powder and after the separation of the oxygen from the hypochlorite, the catalytic agent is allowed to go to waste with the residue in the containing vessel.

One of the principal objects of our invention is to so manipulate the oxid of cobalt or other catalytic agent, that it may be used repeatedly and indefinitely upon successive charges of the gas yielding material, and to accomplish this, our invention consists in incorporating the oxid of cobalt, or other agent, in an amorphous or crystalline form, more or less comminuted, in a retainer or vehicle of inert material, such as molded Portland cement or baked clay. With the catalytic agent thus supported or bonded in or upon the retainer, it can be brought into contact with the hypochlorite solution by simply immersing the retainer in the solution. The particles of catalytic agent exposed on the surface of the retainer will act upon the hypochlorite in the same manner and with the same efficiency as if the agent were introduced into the hypochlorite in liquid or loose powder form, and it will be seen that when the gas yielding material has given up its oxygen, the residue can be withdrawn from the vessel without removing the catalytic agent which, of course, remains in the retainer.

The accompanying drawing illustrates an apparatus that may be advantageously used in carrying out our process.

Figure 1 shows, in section, a container or reaction vessel equipped as contemplated by our invention; Fig. 2 shows a similar view of the reaction vessel in which the retainer for the catalytic agent is composed of a number of bodies, and Fig. 3 illustrates forms of the catalytic retainer.

1 indicates the reaction vessel; 3 is an inlet thereto for the sludge or hypochlorite solution, and 4 indicates the exit for the residue after the solution has given up its oxygen.

5 indicates the pipe through which the oxygen passes off as it is generated, to the usual scrubber and tank, not herein shown.

In Fig. 1, 6 indicates a lining for the reaction vessel consisting of baked clay, Portland cement, or other inert, non-corrosive substance, which can be molded and hardened. This lining contains a suitable percentage of the oxid of cobalt or other catalytic agent in an amorphous or crystalline but more or less comminuted form, which is mechanically held and evenly distributed therein, but of which more or less is exposed upon that surface of the lining which is presented to the solution.

A solution of bleaching powder of about one part to five parts of water by weight, is to be introduced into the vessel 1. For treating such a solution, the amount of cobalt exposed on the lining 6 should be about $\frac{1}{1000}$ of the weight of the bleaching powder. These proportions are best for the commercial production of the oxygen, but they may be varied to suit conditions. The previously heated hypochlorite solution is admitted to the vessel 1 where it comes into contact with the lining 6; thereupon oxygen is rapidly given off and passes out through the pipe 5. Within a short time the solution is spent and the operation is completed. The residue may then be drawn off through the outlet 4, or more of the bleaching powder may be added to the liquor or an entirely fresh solution introduced, and the operation repeated. During the successive operations, the catalytic agent held in the lining remains intact and can be used over and over without loss or appreciable diminution. Any sediment that may adhere to the surface of the retainer should be washed or brushed off from time to time to maintain the full activity of the catalytic agent.

The lining of the vessel 1, it will be observed, acts as a carrier and retainer for the catalytic agent, but as such, may be put up in various forms. As a lining it serves to retain the heat as well as to protect the vessel from corrosion and is preferable for these reasons, but the catalytic agent may be carried by cement or clay blocks, plates or balls, or in fact broken up chunks of the material may be used and any of these forms may be supported or suspended within the vessel in any manner so that the solution may come in contact with the surface thereof, and so be acted upon by the catalytic agent held therein. We also propose to apply the particles of the catalytic agent to the surface only, of the retainer, which can be done by pressing them into the surface while it is in a soft condition.

In Fig. 2 retainers in the form of plates 7 are shown in conjunction with the lining, and a plate of this character together with a retainer in the form of a ball is shown in Fig. 3. If the hypochlorite solution is to be heated after it enters the reaction vessel, instead of before, as previously described, it may be done by blowing hot steam into the vessel through a pipe 2 (Fig. 2). But the heating of the solution is not essential to our invention since oxygen will be released, although at a much slower rate, from a cold solution.

It should be understood that we do not limit ourselves to the particular manner herein described of combining the catalytic agent with the retainer, since the agent in solid but comminuted form can be otherwise bonded in the retainer, as, for instance, the retainer may be impregnated with a cobalt nitrate solution and then subjected to the action of an oxidizing solution which would precipitate the cobalt in the form of an oxid in the pores of the retainer.

Having described our invention, we claim:—

1. A process of generating oxygen consisting in anchoring solid particles of a catalytic agent in a substantially stationary body of oxygen yielding solution, maintaining the reaction until the solution is spent, and then separating the residue of the gas yielding material from the catalytic agent, substantially as described.

2. A process of generating oxygen consisting in anchoring solid particles of a catalytic agent in a substantially stationary body of oxygen yielding solution, allowing the reaction to take place, and then separating the residue of the gas yielding material from the catalytic agent, substantially as described.

In witness whereof, we subscribe our signatures, in the presence of two witnesses.

MAX MAURAN.
JAMES H. MacMAHON.

Witnesses:
FRANCIS L. SMITH,
F. EMIL WILLERS.

---

Copies of this patent may be obtained for five cents each, by addressing the "Commissioner of Patents, Washington, D. C."